(12) United States Patent
Ravimohan et al.

(10) Patent No.: US 10,268,400 B2
(45) Date of Patent: Apr. 23, 2019

(54) SYSTEM AND METHOD FOR FILE DETECTION AND USAGE DURING COMPACTION

(71) Applicant: SanDisk Technologies Inc., Plano, TX (US)

(72) Inventors: Narendhiran Chinaaanangur Ravimohan, Bangalore (IN); Muralitharan Jayaraman, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 274 days.

(21) Appl. No.: 14/844,825

(22) Filed: Sep. 3, 2015

(65) Prior Publication Data

US 2017/0068470 A1 Mar. 9, 2017

(51) Int. Cl.
*G06F 12/02* (2006.01)
*G06F 3/06* (2006.01)

(52) U.S. Cl.
CPC .......... *G06F 3/0619* (2013.01); *G06F 3/0655* (2013.01); *G06F 3/0688* (2013.01); *G06F 12/0246* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| 7,664,906 | B2 * | 2/2010 | Chung | G06F 12/0246 711/103 |
| 8,537,613 | B2 | 9/2013 | Sinclair | |
| 8,713,283 | B2 | 4/2014 | Sinclair | |
| 2007/0033328 | A1 * | 2/2007 | Sinclair | G06F 3/0605 711/103 |
| 2008/0307156 | A1 * | 12/2008 | Sinclair | G06F 12/0246 711/103 |
| 2013/0159304 | A1 | 6/2013 | Halpern, III et al. | |

* cited by examiner

*Primary Examiner* — Charles Rones
*Assistant Examiner* — Ryan Dare
(74) *Attorney, Agent, or Firm* — Dickinson Wright PLLC

(57) ABSTRACT

A non-volatile memory system may include a controller configured for parsing a host file system, identifying a location of a host file system directory and tracking directory entries of files deleted from the host file system directory but having valid data mappings in the logical-to-physical mapping table. The controller may then store the location of the host file system directory, monitor activity in the host file system directory and track validity status information for use in optimizing a compaction process. The compaction process may include segregating into separate compaction destination blocks valid data based on the stored validity status such that data valid in both the host file system directory and the logical-to-physical mapping table is in compaction destination blocks separate from data having valid logical-to-physical mapping entries but associated with deleted host file system directory entries.

18 Claims, 10 Drawing Sheets

SYSTEM AND METHOD FOR FILE DETECTION AND USAGE DURING COMPACTION

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. As the non-volatile memory cell scales to smaller dimensions with higher capacity per unit area, the cell endurance due to program and erase cycling, and disturbances (e.g. due to either read or program operation) may become more prominent.

A host of a memory card typically uses a file system, for example a file system such as FAT32, exFAT, ext2,3 or other known host file systems, to address files and store information about files. The memory card is unaware of this file system and how it is used by the host. NAND flash memory has several known operating restrictions. For example, NAND flash may be written to in increments of a physical page and may be erased in increments of blocks, where each block is a collection of multiple pages. Data may be over-written in the same block only after erase. For this reason, whenever a logical address location which is only part of a block, the firmware does not move the entire physical block to a new block with the overwritten data. Instead, it just marks the stale data as invalid and writes the overwritten data to a new block. After the entire card capacity is full, the memory card performs compaction. During the process of compaction, the memory card picks previously programmed source blocks with invalid data and, for each block, copies the valid data from the picked source blocks to a new block and then erases and re-uses the source block. During this process, it is possible that firmware may pick up logical addresses associated with deleted files (deleted in the host file system directory, but not yet deleted/overwritten in the logical-to-physical mapping table in the memory card) that are still valid according to the firmware, but have not yet been overwritten with new data. Such logical addresses are destined to be over-written very soon as they are actually associated with stale host data. When a write command directed to these logical addresses comes from the host, the data associated with those logical addresses and that has just been moved into the destination block will have to be invalidated by the firmware. This then may lead to unnecessary compaction of this destination block again.

BRIEF DESCRIPTION

Figure 1A:
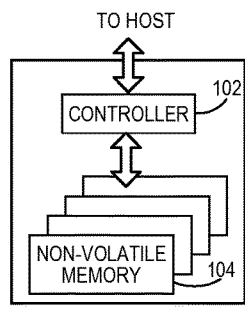
FIG. 1A is a block diagram of an example non-volatile memory system.

By way of introduction, a system and method is described with the ability to discern between two types of valid data in a non-volatile memory and to use that information to segregate the different types of valid data into separate blocks a compaction process within the non-volatile memory. The first type of valid data is that which is considered valid in the host file system directory as well as that which has a valid LBA (Logical Block Address) in the logical to physical mapping table of the memory device, such as the GAT (Group Address Table). In a system utilizing a FAT32 file system, the host file system directory is referred to as the file allocation table or FAT. The second type of valid data which is tracked using the system and method described herein is data which has been deleted from the host file system, but which has not yet been overwritten in the memory system such that a valid logical block address entry mapping the LBA to a physical location still exists in the GAT. By identifying and tracing which type of valid data is in a block, a compaction process may be optimized to segregate the first type of valid data that is valid both in the host file system (FAT) and the logical to physical mapping table (GAT) from the second type of valid data that is only valid in the GAT and is thus likely to be overwritten in the near future. By tracking the different types of valid data, a compaction process may be executed where separate sets of compaction destination blocks are created with only the first type of valid data or only the second type of valid data. After creation of compaction destination blocks with the segregated data validity types, additional undesired compactions may be avoided when data of the second type is later overwritten.

In order to accomplish the segregation during a compaction process, the system and method includes the ability to actively track activity in the host file system such that the memory system can take advantage of the extra information typically not shared by the host directory with the memory system. For example, the memory system may separately monitor write activity to addresses associated with the host file system directories and FAT region and then update data validity information, based on the monitored activity at the directory addresses and FAT, that is separately maintained by the memory system for later use during a compaction process.

In one embodiment, a method for compacting data in a non-volatile memory system includes selecting a source block for compaction in the non-volatile memory system. Valid data is identified in the selected source block, where the identified valid data includes a first type of valid data that is marked valid in a host file system and a second type of valid data that has been deleted from the host file system but that has a valid logical block address in a logical-to-physical mapping table in the memory system. Valid data identified as the first type of valid data is written from the selected source block only to a first compaction destination block, while valid data identified as the second type of valid data is written from the selected source block only to a second compaction destination block so that the first compaction destination block is exclusively reserved for the first type of valid data and the second compaction destination block is exclusively reserved for the second type of valid data.

In one embodiment, a non-volatile memory system includes a non-volatile memory having a plurality of blocks of non-volatile memory cells and a controller in communication with the non-volatile memory. The controller is configured to select a source block from a plurality of blocks for a compaction operation. The controller is further configured to move valid data of a first type from the source block to a first relocation block only containing valid data of the first type and move valid data of a second type to a second relocation block, different than the first relocation block, only containing valid data of the second type. The first type of valid data is data having a valid entry in a host file system directory and the second type of valid data is data part of a file that has been deleted from the host file system directory but that has a valid logical block address entry in a mapping table of the non-volatile memory system.

Figure 1B:
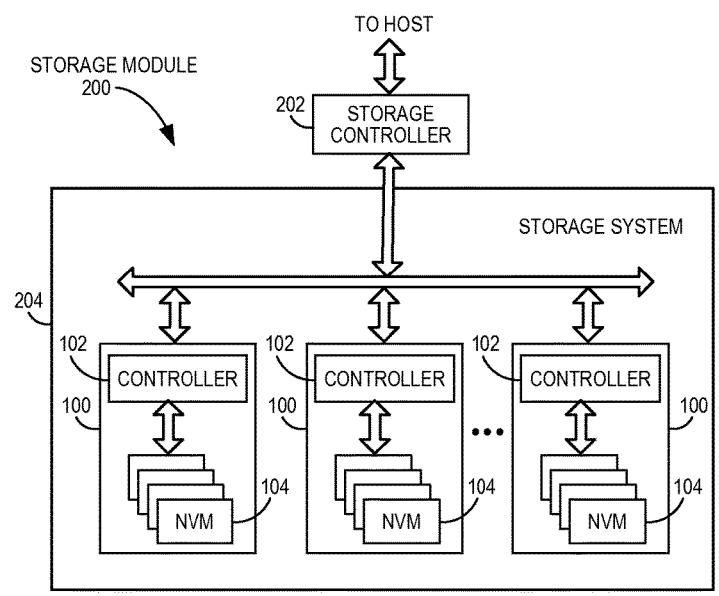
FIG. 1B is a block diagram illustrating an exemplary storage module.
Figure 1C:
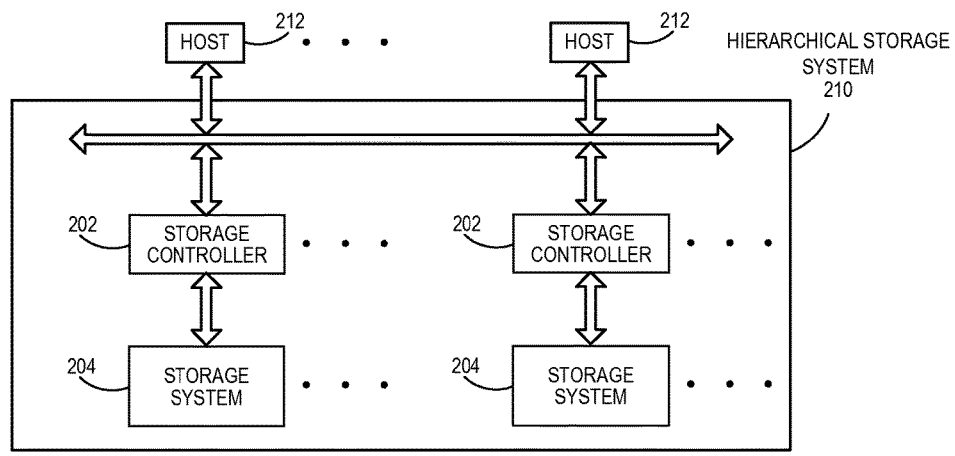
FIG. 1C is a block diagram illustrating a hierarchical storage system.

In yet another embodiment, a method for compacting data in a non-volatile memory system is provided. The method includes determining an address for a host file system directory and monitoring the determined address. The method further includes updating data validity information of data stored in non-volatile memory of the non-volatile memory system based on activity monitored at the determined address. A source block for compaction in the non-volatile memory system is selected. The method continues with moving only a first type of valid data from the selected source block to a first compaction destination block and moving only a second type of valid data from the selected source block to a second compaction destination block, where the second type of valid data comprises data associated with a file deleted from the host file system directory but having a valid logical-to-physical mapping entry in the non-volatile memory system. After moving all of the valid data from the source block, the source block is erased Exemplary Embodiments Examples of suitable non-volatile memory arrangements in which the systems and methods disclosed herein may be used are illustrated in FIGS. 1A-1C. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 includes a single channel between controller 102 and non-volatile memory die 104, the subject matter described herein is not limited to having a single memory channel. For example, in some NAND memory system architectures, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
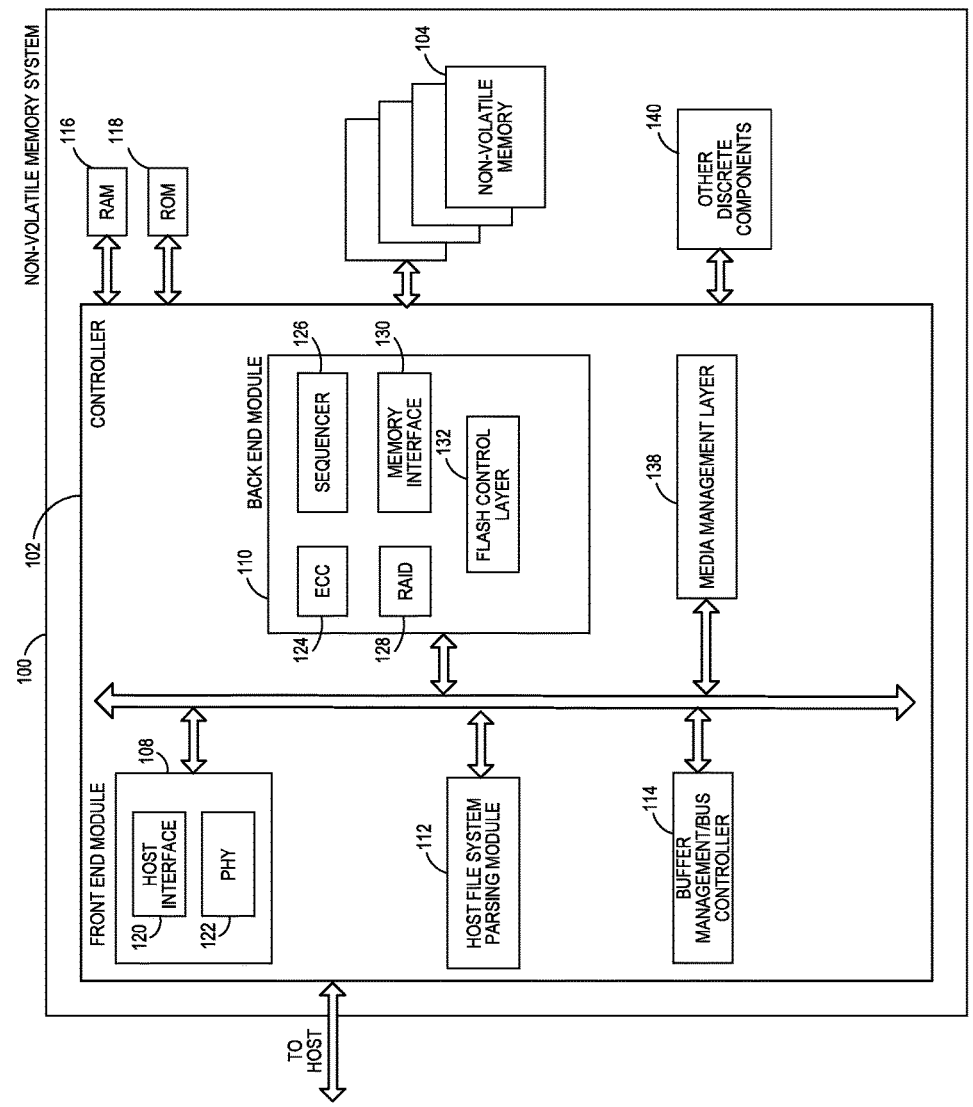
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

Each module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a host file system parsing module 112 present on the die of the controller 102. As explained in more detail below, the host file system parsing module 112 may handle the determination and management of different types of valid data in a non-volatile memory system. The host file system parsing module 112 may, on startup of the memory system 100 or upon formatting of the memory system, determine the location of the host file system directories. The host file system parsing module 112 handles the tracking of whether data is valid data of a first type (valid in both the host file system directory and the logical-to-physical mapping table, valid data of a second type (deleted from the host file system directory but valid in the logical-to-physical mapping directory), or invalid data.

Referring again to the modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM and ROM may be located both within the controller 102 and outside the controller 102. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
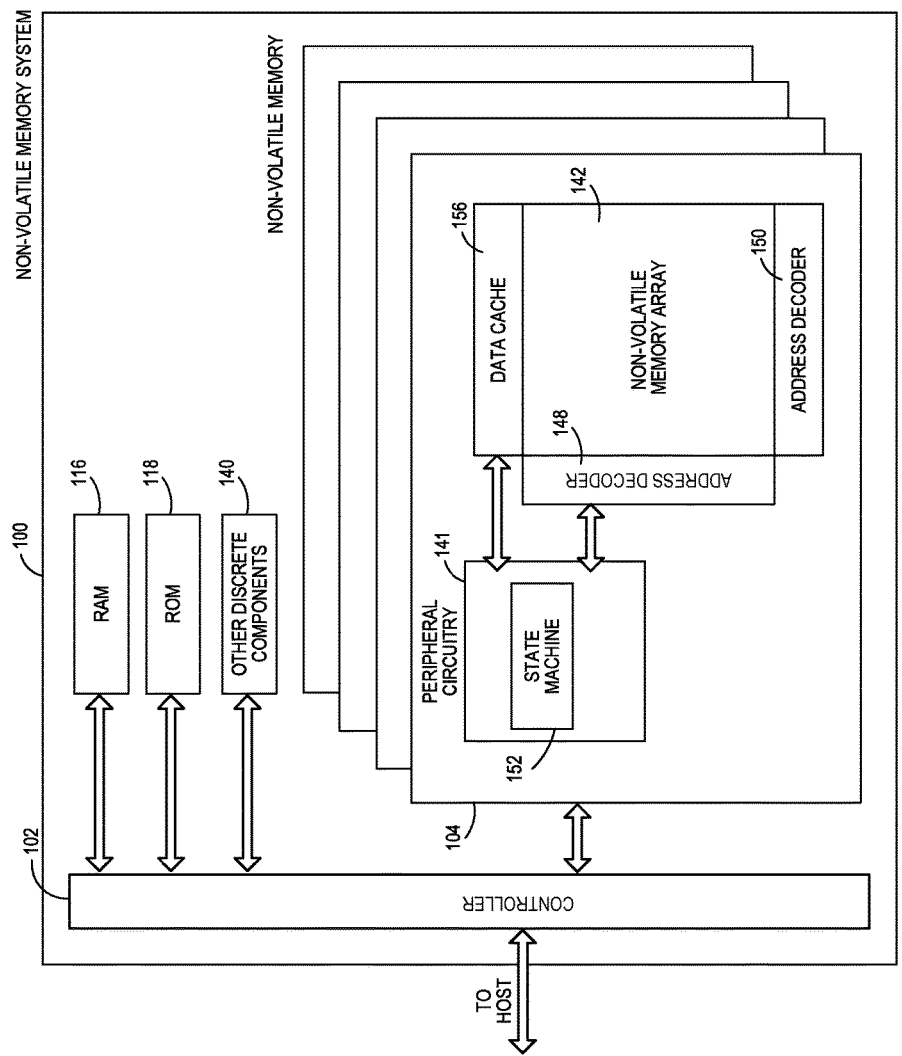
FIG. 2B is a block diagram illustrating exemplary components of a non-volatile memory in a non-volatile memory system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. The controller 102 may be implemented in a single integrated circuit chip and may communicate with the different layers of memory in the non-volatile memory die 104 over one or more command channels. Controller executable code for implementing memory management instructions such as described herein may be stored in the non-volatile flash memory.

Figure 3:
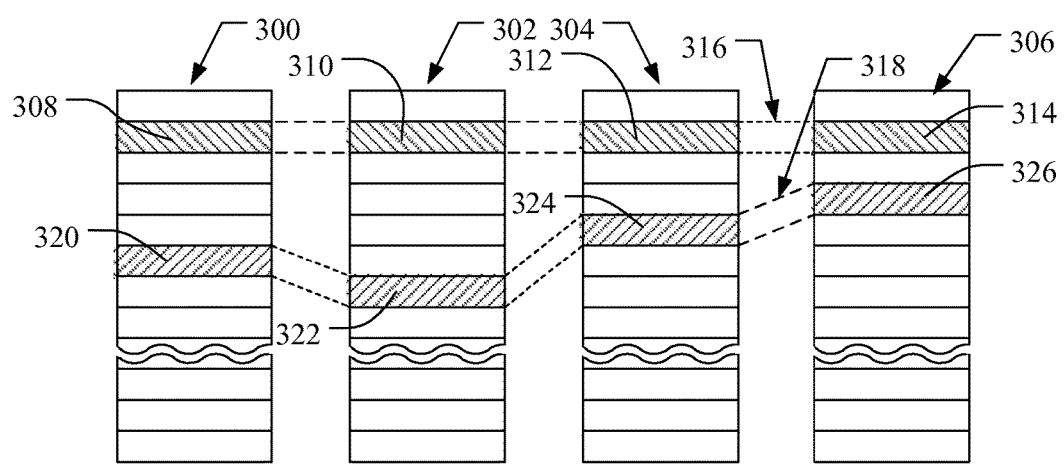
FIG. 3 illustrates an example physical memory organization of the non-volatile memory system of FIG. 1A.

The non-volatile flash memory array 142 in each die 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
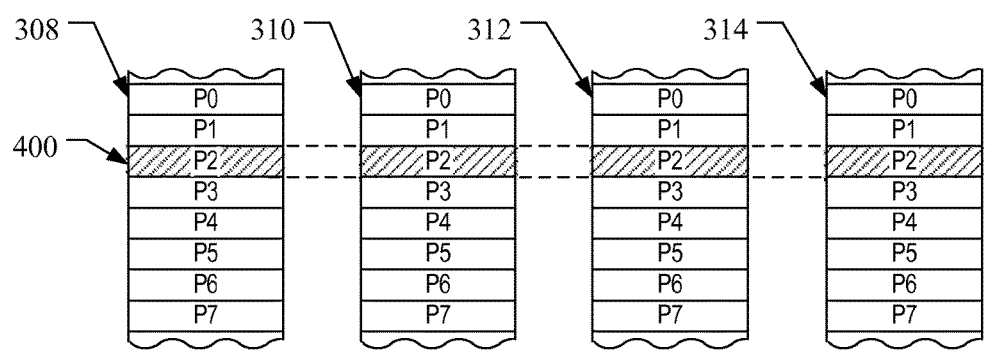
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312, and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is the maximum unit of programming. The blocks disclosed in FIGS. 3-4 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host. The LBAs are then mapped to one or more physical blocks in the non-volatile memory system 100 where the data is physically stored.

Figure 5:
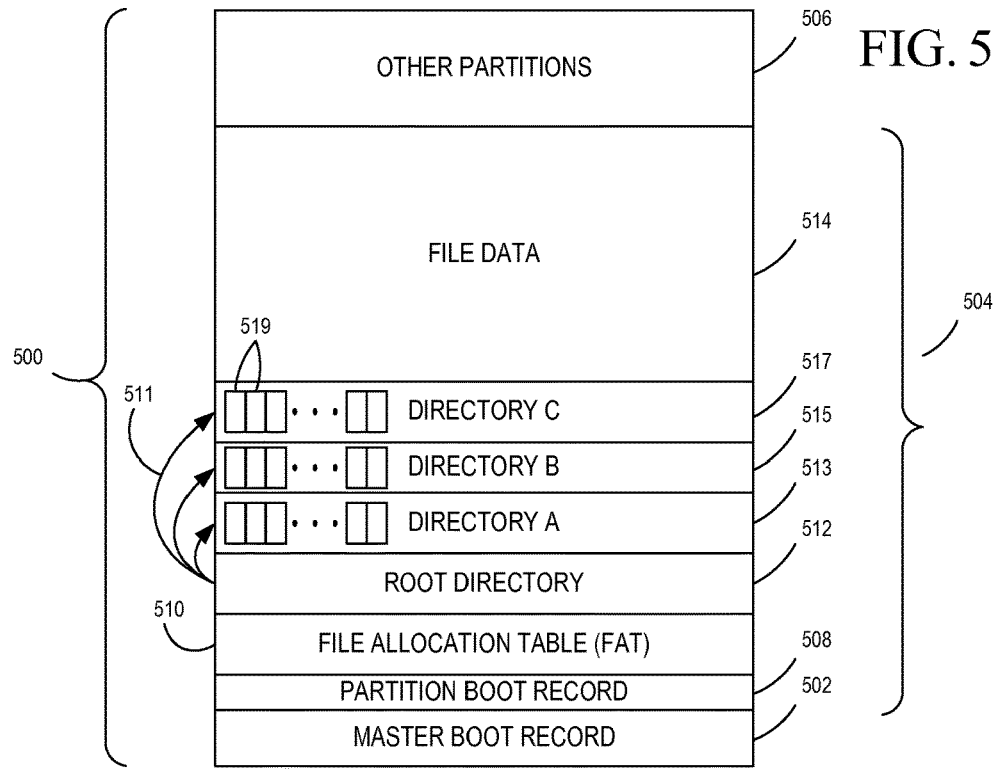
FIG. 5 illustrates example partitions of data and host file system components stored in a non-volatile system.

Referring to FIG. 5, an example host file system arrangement is shown for the entire memory system 100, where host file system 500 is one implementation of memory structures usable on memory system 100 of FIGS. 1-4. The file system 500 includes a Master Boot Record (MBR) 502, a host file system such as a file allocation table (FAT) partition 504 and, optionally, other partitions 506. The MBR 502 is typically found at Logical Block Address (LBA) 0 and holds information on how the various partitions are organized in the memory system. The MBR typically includes executable code known as a boot loader. The FAT partition 504 includes a partition boot record 508, a file allocation table (FAT) 510, a root directory 512 and the file data 514 associated with the root directory 512 and multiple possible directories inside the root directory and files within them and so on. In FIG. 5, the root directory 512 of the host file system 500 includes entries for various file system directories, such as directory A 513, directory B 515 and directory C 517 where the entries in the root directory may include pointers 511 and other information regarding these directories 513, 515, 517. Each of the host file system directories (directories A-C in this example) may include directory entries 519 with information and pointers to individual files or folders of files associated with each respective host file system directory 513, 515, 519. Although three host file directories 513, 515, 517 are illustrated as associated with a root directory 512 in the host file system 500 example of FIG. 5, host file systems having a greater or lesser number of directories, and having different mapping arrangements, may be implemented in other embodiments.

Figure 6:
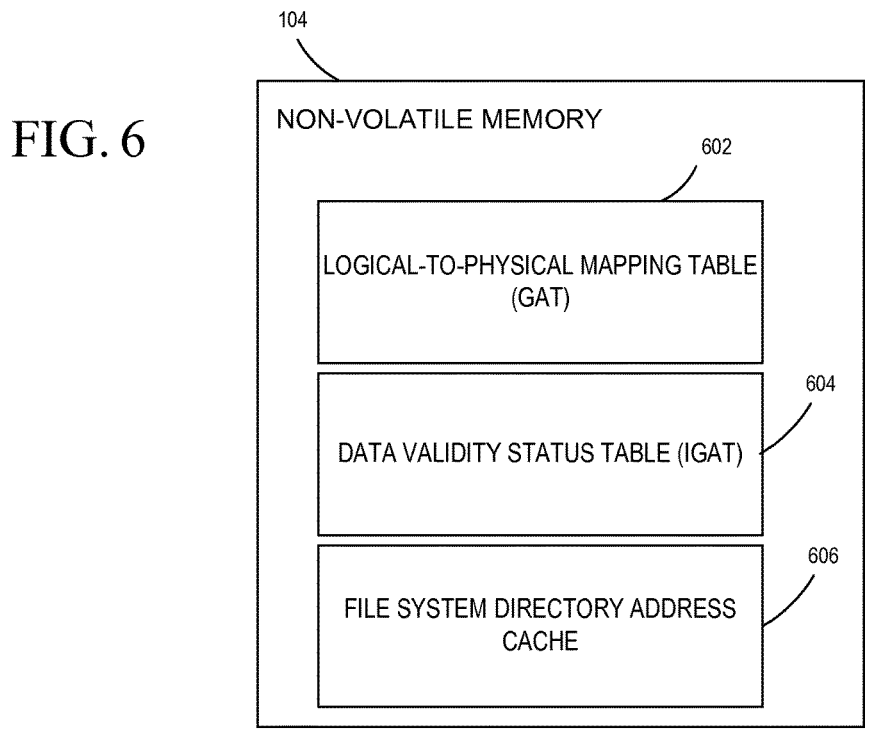
FIG. 6 illustrates one implementation of data structures in non-volatile memory usable in the system and method described herein.

Referring to FIG. 6, the non-volatile memory 104 of the memory system 100 may include a logical-to-physical mapping table 602, sometimes referred to herein as a group address table or GAT. The logical-to-physical mapping table includes the mapping of host logical block addresses (LBAs) to physical addresses of blocks/pages in the memory system 100. A data validity status table 604, sometimes referred to here as an IGAT, can be used to store validity information determined by the host file system parsing module 112 module, for example what type of valid data (for example, whether it is invalid, valid belonging to first category or valid belonging to second category) is associated with LBA addresses in every physical block. In one embodiment, the memory system 100 also includes a file system directory address cache 606 into which the controller 102, via the file system parsing module 112, may store the location of the various directories of the host file system, such as the location of directories in the FAT partition 504 noted in FIG. 5. Although the non-volatile memory 104 of the memory system is illustrated as holding these data structures in FIG. 5, other memory locations in the memory system are contemplated. For example, a copy of all or a portion of one or more of these data structures (602, 604, 606) may be stored in RAM 116 inside or outside of the controller 102 for faster access.

Figure 7:
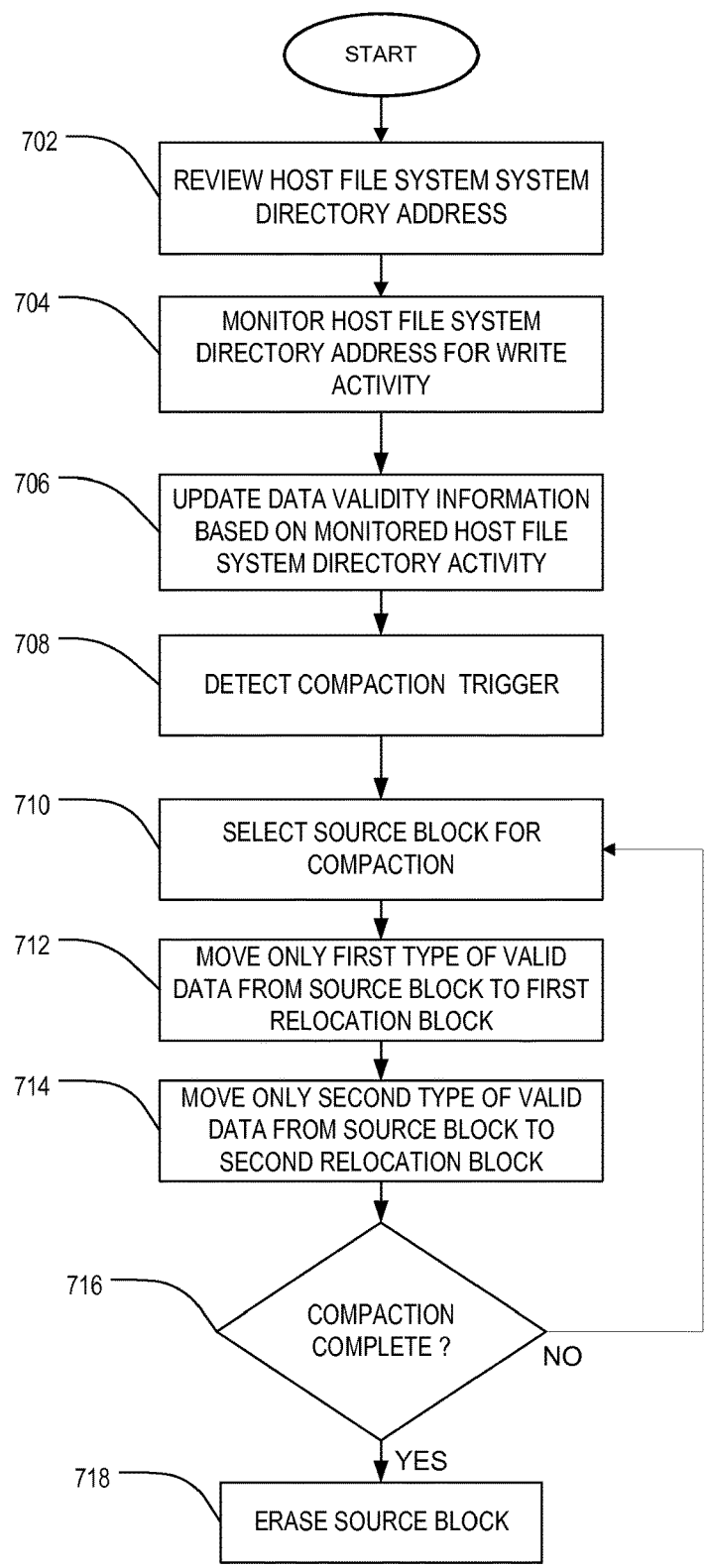
FIG. 7 is a flow diagram illustrating a method of compaction according to one implementation.

Utilizing a memory system such as the memory system 100 discussed above, a method of performing a compaction process that segregates data of different validity types into separate compaction destination blocks is shown in FIG. 7. When the memory system 100 is first powered up or otherwise initialized or formatted, the host file system parsing module 112 determines and reviews the host file system directory addresses and stores those addresses in the file system directory address cache 606 (at 702). In one implementation, determining an address for each host file system directory 513, 515, 517 may also include determining file addresses and sizes from entries 519 in each host file system directory. Once the host file system parsing module 112 has acquired all of the addresses for the directories in the host file system 500 (in this example the directories in the FAT partition 504), the host file system parsing module 112 may monitor those directory addresses for any host write activity (at 704).

Monitored activity includes any type of change to data stored at those host file directory addresses. When a file is deleted, the host will typically mark the file as deleted in that file's entry 519 in the host file system directory 517, but not delete or overwrite the data associated with that file in the memory. If any activity is detected at the previously determined directory address and data is changed in a known host file directory address, the host file directory parsing module 112 will look to determine which file entry 519 in that directory it was and read data relating to whether that file (or fragment of file) is subject to a change in validity status. If there has been a change to the status of the validity, then the host file system directory parsing module 112 may update the IGAT 604 with the validity information that was discovered from the monitored host file system directory activity (at 706). For example, if a file entry is deleted in the directory, the host file system parsing module may compare the host file system directory information to that previously saved in the file system directory address cache 606 and then update the data validity status for the data fragments (for example pages of data) that are affected to indicate that the directory entry has been deleted. If the data associated with that deleted entry has not been overwritten (for example based on the existence of valid logical-to-physical mapping table entries for the data, then the host file system parsing module 112 may alter the status indicator in the IGAT 604 to show that the fragments are now a second type of valid data (deleted directory entry but valid GAT entry) rather than the first type of valid data (valid host file system directory entry and GAT entry.

Although different arrangements of the IGAT 604 are contemplated, in one implementation the IGAT 604 contains validity status entries for each logical block address entry in each physical block. A two bit per entry arrangement may be used to track validity for a memory system that includes a first type of valid data (valid file system directory entry and GAT entry), a second type of valid data (deleted/invalid host file system directory entry and valid GAT entry) and obsolete (invalid) data status. If the directory entry for a LBA is deleted in the host file system by a host file system directory update, but still has a valid entry in the GAT 602, the host file system parsing module 112 may modify an entry for that LBA in the IGAT 604 to set the validity bit to identify a second type of valid data entry. This indicates that the host file system directory has deleted the directory entry associated with the LBA and thus it is not valid data in the host file system directory, but that it is still considered valid by the system according to the GAT 602. The process of monitoring the various file directory addresses in the host file system 500 and then updating the IGAT 604 allows the non-volatile memory system to differentiate between data that is valid both in the host file system 500 and in the non-volatile memory system 100 from data that is not valid in the host file system 500 but still has a valid logical block address recorded in the GAT 602.

Referring again to FIG. 7, the information maintained in the IGAT 604 from monitoring the host file system directory changes is utilized by the controller 102 of the memory system 100 whenever a compaction operation is necessary. As noted previously, compaction is a process of moving valid data from previously programmed source blocks to a new compaction destination block and then deleting the source block from which the valid data was moved so that more free blocks are available. A free block refers to a physical block in the non-volatile memory 104 having no valid data that is now available for use by the memory system 100.

The compaction process may be triggered by any of a number of commonly known events, such as the number of free blocks in the memory system 100 falling below a predetermined threshold. Any number of other predetermined triggers for compaction may also be utilized. When the controller 102 identifies a compaction trigger (at 708), then the controller 102 of the memory system 100 will select a source block for compaction (at 710). Selection of a source block may simply be based on the ratio of valid data to obsolete data in a previously programmed block. The previously programmed block having the least amount of valid data may be selected and the compaction process started. In one implementation, for purposes of determining a ratio of valid to invalid data in a block, both types of valid data may be counted as valid in the selection of a source block. Due to the fact that the host file system parsing module 112 has been tracking activity in the host file system directories and updating the IGAT 604 to identify different types of valid data (for example, type 1 and type 2 valid data as disclosed above) the controller 112 for the memory system 100 may direct valid data of a particular type to only one destination block. Typically, data marked in the IGAT 604 as type 1 valid data is exclusively directed by the host file system parsing module 112 of the controller 102 to a first compaction destination block (at 712) while data of the second valid data type from that selected source block is directed exclusively to a second compaction destination block (at 714). When one of the first and second compaction destination blocks is filled up with the respective type of valid data designated for that compaction destination block, a free block is selected and becomes the new compaction destination block for that particular data type. Segregation of type 1 valid data from type 2 valid data into separate pools of relocation blocks is thus achieved throughout the compaction process in any subsequent compaction processes. Also, although FIG. 7 illustrates that one type of valid data is moved and then the other type of valid data is moved, the process may instead be to move each page of data (or other data size increment) to the appropriate compaction destination block based on type of valid data in the order that the data is scanned in the selected source block.

When the compaction process is complete (at 716), then the controller 102 may take the source block or blocks and fully erase them and put them in a free block pool for the memory system (at 718). If the compaction operation is not complete, then another source block may be selected and the process of segregating the different types of valid data into respective compaction destination blocks of only one type of valid data is repeated. What constitutes the completion or conclusion of a particular compaction cycle may depend on the type of compaction used in the memory system 100. For compaction which only requires the freeing of a single selected source block, once all the valid data of the different types has been moved from the source block, the compaction process may end. In other compaction processes, where multiple source blocks must be for the compaction process to be considered complete, or where the goal is to fill up a compaction destination block such that multiple source blocks are necessary to find enough valid data necessary to fill that compaction destination block, the compaction process may only be considered complete upon filling at least the one compaction destination block.

Figure 8:
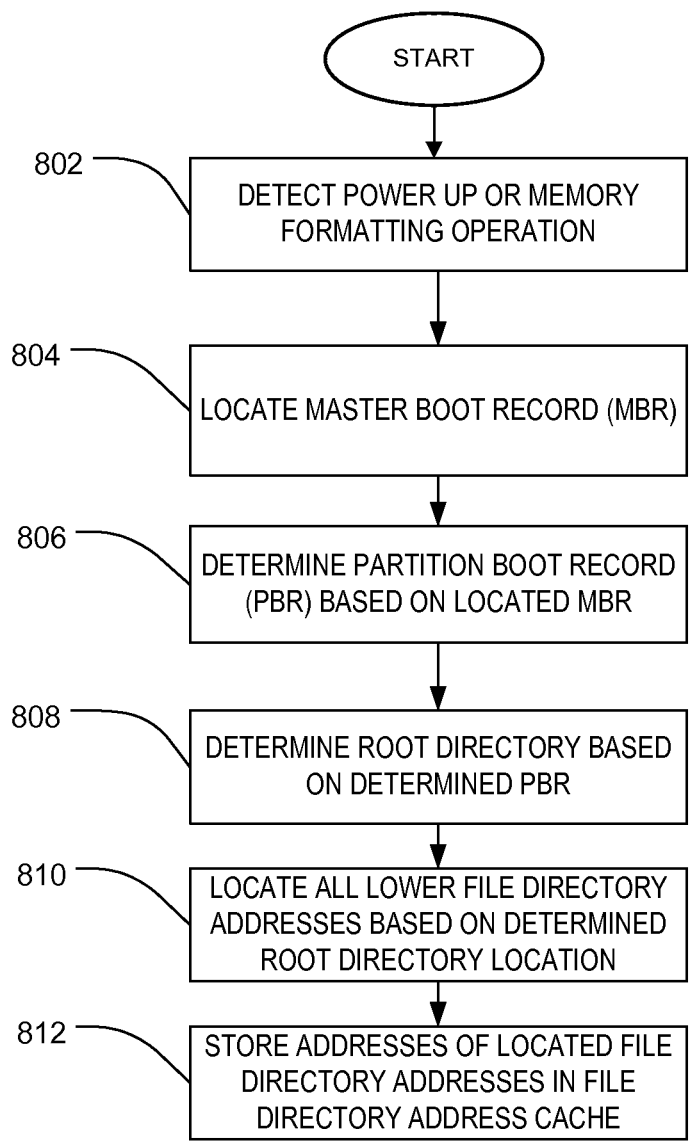
FIG. 8 is a flow diagram illustrating one suitable method of locating host file system directory addresses for use in the method of FIG. 7.

As noted in the first step of the process illustrated in FIG. 7, in order for the host file system parsing module 112 in the memory system 100 to keep track of host file system activity controlled by a host, the host file system parsing module 112 needs to know where the directories 513, 515, 519 in the host file system 500 are located. This may be accomplished at power up of the memory system 100, or upon a reformatting of the memory 104 by the host, and the specifics may be dictated by the particular host file system structure. Assuming that the host file system is the example FAT file system of FIG. 5, an example of steps for reviewing and determining the host file system directory addresses is shown in FIG. 8. Upon detecting a power up or a formatting command at the memory system, the host file system parsing module 112 initiates an operation to locate the master boot record (MBR) 502 for the file system 500 (at 802, 804). For example, the host file system parsing module 112 may retrieve the information in the MBR 502 to find out the offset for the next level in the directory, typically referred to as a Partition Boot Record (PBR) 504. The host file system parsing module 112 may determine the PBR address from a known fixed offset from the MBR address (at 806). The next level of the directory tree in the host file system 500 is typically a root directory 512 and that root directory may be found at a predetermined offset in the PBR (at 808). Once the root directory is found, the root directory then points to all the directories under it in a tree pattern. The host file system parsing module 112 then parses the tree to find the end nodes or branches of each directory and saves the addresses in a directory address cache 606 (at 810, 812). The cache 606 may be located in non-volatile memory 104 or volatile memory 116 in the memory system 100. After storing the addresses of the directories of interest in the cache 606, the host file system parsing module 112 can then know where to look for changes in directory information such as LBA ranges where addresses have been deleted from a directory by a host.

Figure 9:
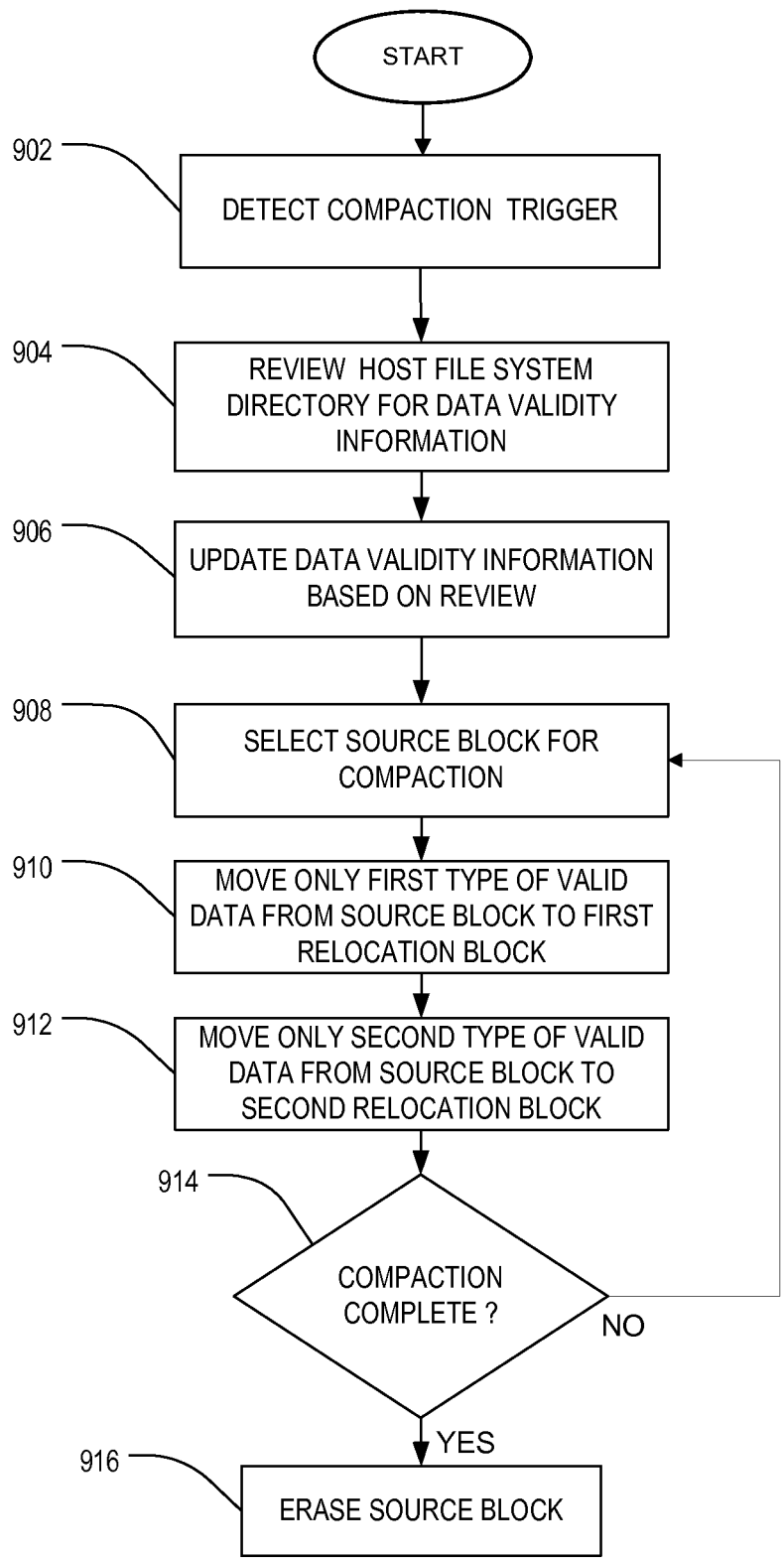
FIG. 9 is a flow diagram illustrating an alternative embodiment of the method of FIG. 7.

In contrast to the process shown in FIG. 7, FIG. 9 illustrates an alternative to continuously tracking host file system activity and updating the IGAT 504 to have the latest information on data validity type ready for use when a compaction trigger is detected. Instead of the continuous updating by the host file system parsing module, the process of FIG. 9 shows a real-time or on-demand version of host file system directory parsing. For example, in the alternative implementation of FIG. 9, the controller 102 first detects a compaction trigger (at 902) and then the host file system parsing module 112 reviews the host file system 500 to determine the current validity status of data in the memory system 100 (at 904).

As the host file system parsing module scans the directories for information on what LBA ranges are listed with valid entries in the directories identified in the file system directory address cache 606 and compares that to the LBA ranges with valid entries in the logical-to-physical mapping table (GAT), it updates the data validity status table (IGAT) 604 with the type of valid data associated with each LBA (at 906). The process of updating the IGAT may include marking each fragment of data in the IGAT 604 with an indicator or flag that represents a current validity status and type. For example, in response to a directory entry at the host file system directory address being overwritten while a logical-to-physical mapping entry in the GAT 602 associated with the data fragment remains valid, the controller 102 may set a flag or bit in the associated IGAT entry to correspond to the second type of valid data discussed above. After finishing the on-demand directory scan of the directories 513, 515, 517 in the host file system 500, the host file system parsing module 112 can then use the updated IGAT information to select the appropriate source block for compaction (at 908), such as the source block with the least amount of valid data.

As with the compaction process illustrated in FIG. 7, the host file system parsing module 112 looks at the different types of valid data, based on the IGAT 604 information, in the selected source block and moves valid data of one type to a first compaction destination block and valid data of the other type to a separate compaction destination block, with the result that separate pools of compacted blocks are created, each with only one type of valid data (at 910, 912). If compaction is complete, based on the predetermined criteria of a completed compaction cycle as described above for FIG. 7, the source block may be erased (at 916). A primary difference in the alternative method of FIG. 9 to that of FIG. 7 is that the validity type data is not maintained in the IGAT 604 until such time as a compaction step is necessary. While the time it takes for a compaction in the implementation of FIG. 9 may increase based on the need to do all the parsing of the host file directories at the time of compaction, the amount of RAM 116 necessary to store the completed IGAT 604 is less. Specifically, the IGAT 604 is only fully generated at the time of compaction and the RAM 116 may otherwise be freed during operation of the memory system 100. In yet other alternative embodiments, even the task of determining the host file system directory addresses may wait until such time as the compaction trigger is identified, rather than identifying the directory address locations upon startup as indicated in FIG. 8.

Figure 10:
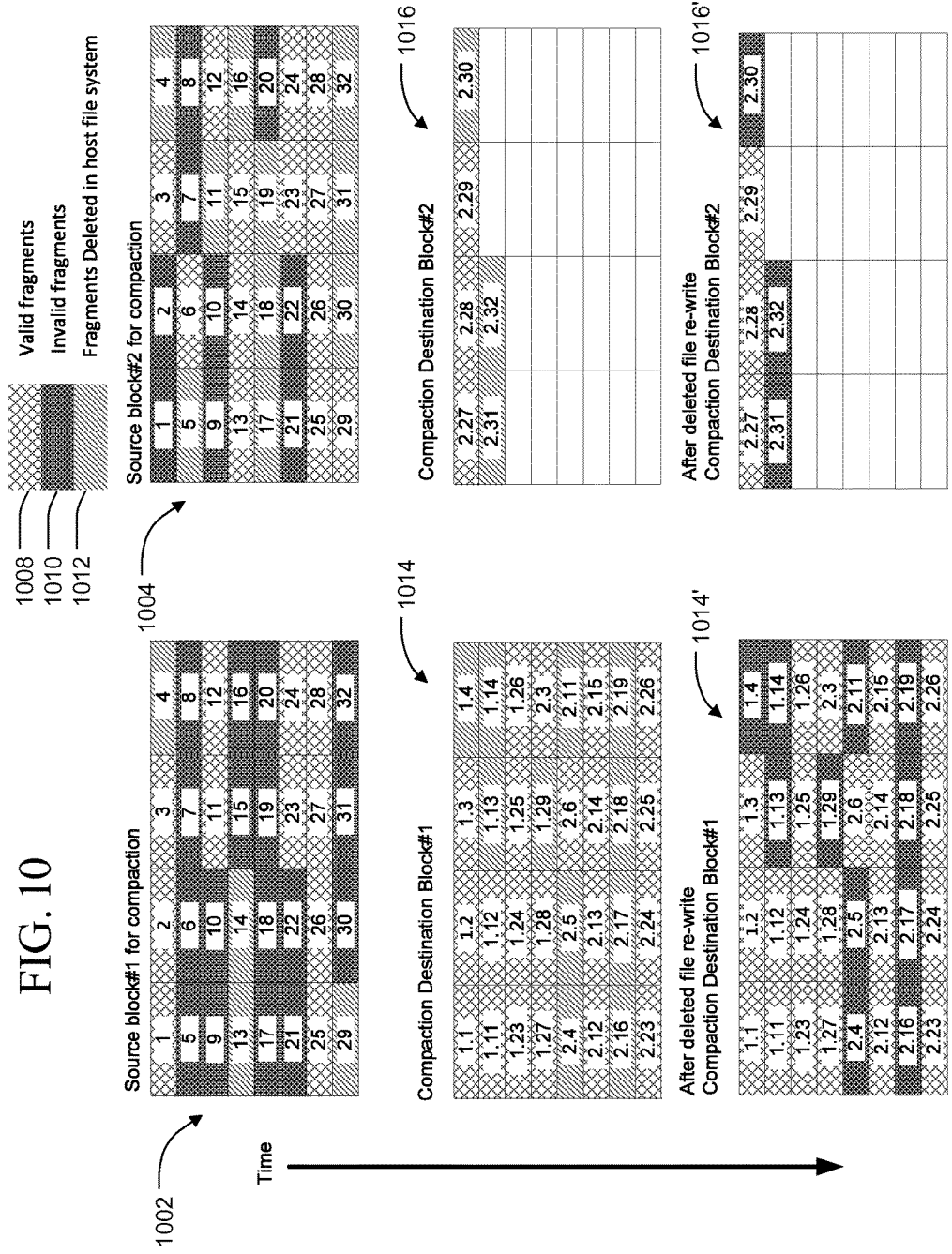
FIG. 10 illustrates an example compaction process that does not implement segregation of types of valid data.
Figure 11:
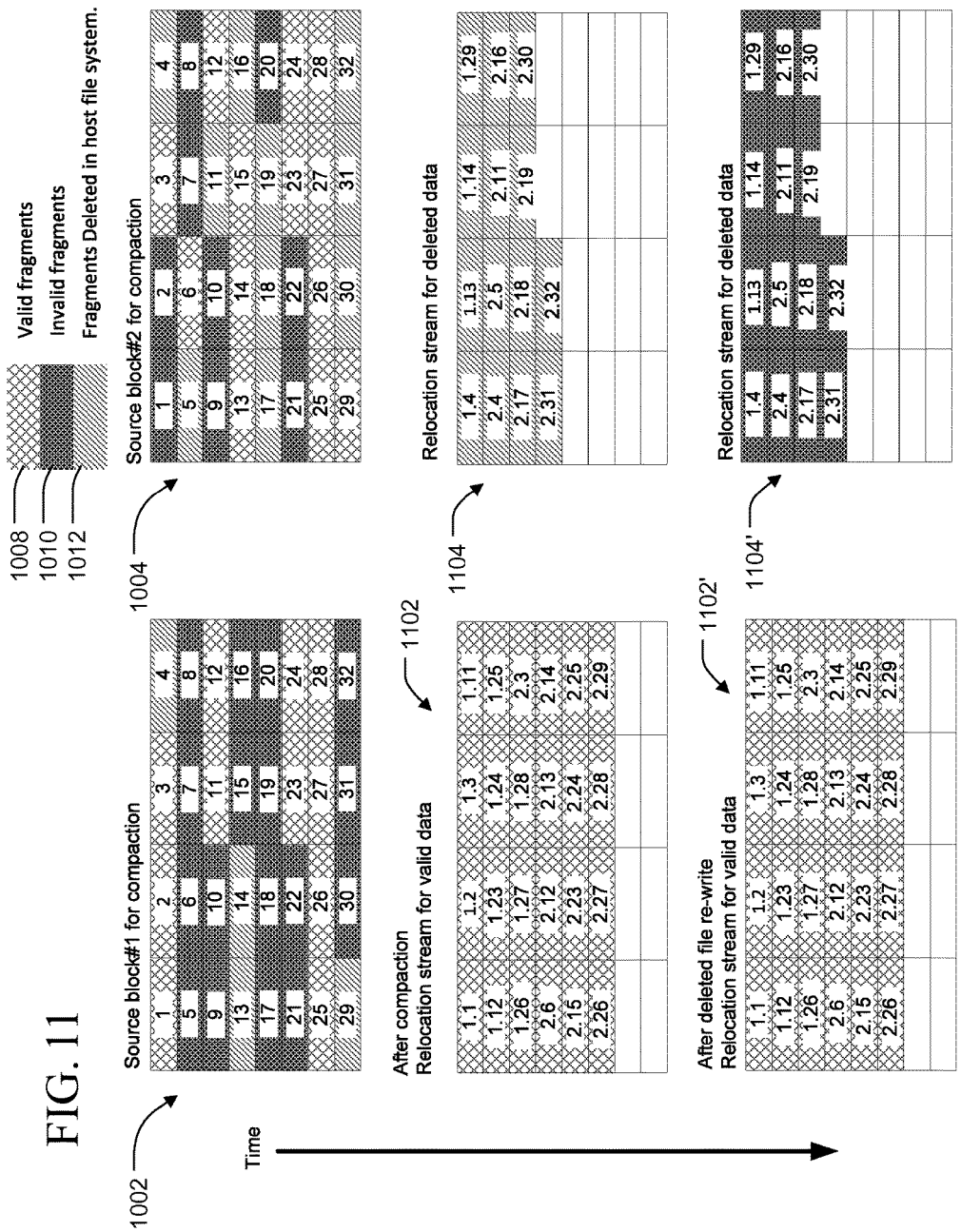
FIG. 11 illustrates am example compaction process that implements segregation of different types of valid data according to the methods illustrated in FIGS. 7 and 9.

FIGS. 10 and 11 provide one illustration of the contrast between the typical compaction activity (FIG. 10) and compaction segregating different types of valid data into separate compaction destination blocks (FIG. 11) where valid data of a first type includes data valid both in a host file system directory and in the logical to physical (e.g. GAT) table and data not valid in the host file system directory but still having valid LBA addresses listed in the GAT. Referring to FIG. 10, first and second source blocks 1002, 1004 are selected for compaction by the controller 102 of the memory system 100. Each of the selected source blocks 1002, 1004 is a previously programmed block containing valid and invalid fragments, where a fragment is any group of LBAs that are sequential. In FIG. 10, fragments (in this instance each fragment is the size of a page) in a block are shown as a first type of valid data 1008, fully deleted obsolete (invalid) data 1010, and a second type of valid data 1012 where the host file system directory entry has been deleted but the data has not been overwritten with new host data and thus still has a valid entry in the logical-to-physical mapping table (e.g. GAT) 602. Each of these different data types is shown in a different hash style in FIGS. 10 and 11 to emphasize the difference between the types of valid data and the obsolete data that is actually present. In the method of compaction showing FIG. 10, the different valid data types are not actually tracked or utilized.

Accordingly, compaction without identification and segregation of different types of valid data as shown in FIG. 10 treats all data of either validity type (1008, 1012) as valid data and simply takes any valid data from the source blocks 1002, 1004 in the order they are found and places them together into a single compaction destination block 1014 until that block is filled and then another compaction destination block 1016 is used. The compaction destination blocks thus contain a mixture of the types of valid data. For clarity of illustration, each of the pages 1006 in each compaction destination block 1014, 1016 includes a reference to the source block number and the page from the source block. The first page in compaction destination block 1014 lists "1.1" indicating that the valid data from the first source block 1002, page 1 resides in that page. Later in that compaction destination block 1014, when the valid data from the first source block 1002 has been exhausted and more space remains, the valid data from the second source block 1004 begins. The first valid data fragment from the second source block 1004 is from page 3 and illustrated as valid data fragment "2.3" in the first compaction destination block 1014. The next fragment moved to the first compaction destination block 1014 is "2.4" which is the fourth page (fragment) from the second source block 1004 which is a fragment of the second type of valid data in this example. Using this typical type of compaction strategy, the different types of valid data 1008, 1012 are both placed in the relocation blocks 1014, 1016 in the order they are found in the original source blocks 1002, 1004.

Later in time, as shown in the bottom row of FIG. 10, the valid data fragments of the second type 1012 as of the time of the initial compaction, relating to data fragments that have been deleted in host file system but still had valid data as of the time of compaction shown in compaction destination blocks 1014, 1016, has now been overwritten because the host system needed to use those available but not yet deleted data locations for new data. Thus, the fragments that have been deleted in the host file system in the initial compaction at blocks 1014 and 1016 are now shown in the aged compaction destination blocks 1014', 1016' as completely invalid data fragments 1010 as they have been overwritten. The aged compaction destination blocks 1014', 1016' now will need a compaction step. Because the second type of valid data 1012 was mixed in with the first type of valid data 1008 during compaction, the fact that the second type of valid data 1012 is likely to be overwritten sooner than the first type of valid data is not unexpected and may result in needing another compaction operation sooner.

Referring now to FIG. 11, a compaction example using the method and system described herein for identifying, tracking and segregating different valid data types into different compaction destination blocks is shown. The starting point for the example in FIG. 11 includes the same configuration of source blocks 1002, 1004 as in FIG. 10, including the same initial distribution of invalid data fragments 1010 and valid fragments of different types 1008 (valid in both host file system and GAT), 1012 (directory entry deleted in the host file system). In this example, however, the host file system parsing module 112 has actively kept track of the different types of valid data either through maintaining the IGAT in real time as directory writes are made to the addresses for the various file directories in the host file system 502 or by parsing the file directories at the time a compaction takes place, and the different types of valid data are directed to different compaction destination blocks 1102, 1104. The first compaction destination block 1102, receives only those fragments of valid data of the first type 1008. The second compaction destination block 1104 includes only relocated valid data of the second type 1012. As time passes the expected overwriting of the valid data of the second type 1012 is illustrated in relocation block 1104' and, because it is not mixed in with the data of the first type, no valid data has to be moved movement when that block 1104 needs to be erased and made into a free block. This is a hypothetical example shown for ease of illustration, but the principle of reducing the probability that valid data of the second type 1012 (that is likely to be over-written by the host first because the host has deleted the directory entry for those logical addresses already and sees those logical addresses as available space) will lead to the need for another compaction shortly after an initial compaction step is seen in the hypothetical of FIG. 11. Accordingly, undesired subsequent compaction may be delayed or avoided by segregating valid data of the different types into separate compaction destination blocks 1102, 1104.

In addition to allowing segregation of the different types of valid data defined above during compaction, the host file system parsing module 112 and the additional data validity information saved in the data validity status table (e.g. IGAT) 604 may be used by the controller 102 to recover a deleted file. If the addresses have not yet been overwritten by the host, then the second type of valid data may still be possible to recover from the memory system, even though the host has deleted the directory entry for the data from the host file system.

The discussion above is not limited to a specific type of non-volatile memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

As has been described in greater detail above, a system and method for a memory system to detect files and use the host file system information during compaction has been provided. Using a host file system parsing module and storing data on the location of host file system directories, data that is part of a file that has been deleted in the host file system, but that has not been overwritten and so has valid entries in the logical-to-physical mapping table of the memory system may be tracked and segregated during compaction.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for compacting data in a non-volatile memory system, the method comprising:
   selecting a source block for compaction in the non-volatile memory system;
   identifying valid data in the selected source block, wherein the identified valid data includes first validity level data that is marked valid in a host file system and second validity level data that has been deleted from the host file system but that has a valid logical block address in a logical-to-physical mapping table in the non-volatile memory system, wherein identifying valid data comprises a controller in the non-volatile memory system scanning a logical-to-physical mapping table and a host file system directory stored in the non-volatile memory system to determine whether the valid data is the first validity level data or the second validity level data;

writing valid data identified as the first validity level data from the selected source block only to a first compaction destination block; and writing valid data identified as the second validity level data from the selected source block only to a second compaction destination block, wherein the first compaction destination block is exclusively reserved for the first validity level data and the second compaction destination block is exclusively reserved for the second validity level data.

2. The method of claim 1, further comprising erasing the selected source block after writing all valid data from the selected source block to the first or second compaction destination blocks.

3. The method of claim 1, wherein the valid data comprises a plurality of data fragments and further comprising storing information on a status of each of the plurality of data fragments in a data validity status table in the non-volatile memory system, the status comprising an identification of whether a data fragment is first validity level data or second validity level data.

4. The method of claim 1, wherein selecting the source block comprises detecting a compaction trigger for the non-volatile memory system and selecting a block as the source block in response to detecting the compaction trigger.

5. The method of claim 4, wherein detecting the compaction trigger comprises determining that a number of free blocks in the non-volatile memory system has fallen below a predetermined threshold.

6. The method of claim 1, wherein selecting the source block comprises selecting a block in the non-volatile memory having a lowest ratio of valid data to invalid data.

7. A non-volatile memory system comprising:
a non-volatile memory having a plurality of blocks of non-volatile memory cells;
a controller in communication with the non-volatile memory, the controller configured to:
select a source block from a plurality of blocks for a compaction operation;
scan a logical-to-physical mapping table and a host file system directory stored in the non-volatile memory system to determine whether valid data in the source block is first validity level data or second validity level data;
move valid data of the first validity level from the source block to a first relocation block only containing first validity level data;
move valid data of the second validity level to a second relocation block, different than the first relocation block, only containing valid data of the second validity level; and
wherein the first validity level data is data having a valid entry in the host file system directory and the second validity level data is data that has been deleted from the host file system directory but that has a valid logical block address entry in the logical-to-physical mapping table of the non-volatile memory system.

8. The non-volatile memory system of claim 7, wherein the non-volatile memory comprises a three-dimensional (3D) memory configuration.

9. The non-volatile memory system of claim 7, further comprising a data validity status table, wherein the data validity status table comprises information indicating whether the valid data is first validity level data or second validity level data.

10. The non-volatile memory system of claim 9, wherein the controller of the non-volatile memory system is configured to update the data validity status table in response to host write activity detected at a location of the host file system directory in the host file system.

11. The non-volatile memory system of claim 10, wherein the controller is configured to select the source block in response to detecting a compaction trigger.

12. The non-volatile memory system of claim 10, wherein the controller is configured to select a block having a least amount of valid data as the source block.

13. A method for compacting data in a non-volatile memory system, the method comprising:
determining an address in the non-volatile memory system for a host file system directory;
monitoring the determined address;
updating data validity information of data stored in non-volatile memory of the non-volatile memory system based on activity monitored at the determined address;
selecting a source block for compaction in the non-volatile memory system;
moving only valid data of a first validity level from the selected source block to a first compaction destination block and moving only valid data of a second validity level from the selected source block to a second compaction destination block, wherein the second validity level data comprises data associated with a file deleted from the host file system directory but having a valid logical-to-physical mapping entry in the non-volatile memory system;
erasing the selected source block; and
wherein updating data validity information comprises a controller in the non-volatile memory system marking a status of a data fragment in a data validity status table as corresponding to the second validity level in response to a directory entry at the host file system directory address being overwritten while a logical-to-physical mapping entry associated with the data fragment remains valid.

14. The method of claim 13, wherein determining the address for the host file system directory comprises determining the address only upon detecting a power-up or a memory format operation at the non-volatile memory.

15. The method of claim 13, wherein determining the address for the host file system directory comprises the controller of the non-volatile memory system parsing the host file system, locating the address for the host file system directory based on a root directory in the host file system and storing the located address for the host file system directory in a file system directory address cache in the non-volatile memory system.

16. The method of claim 13, wherein selecting the source block comprises the controller of the non-volatile memory system selecting a previously programmed block from a plurality of blocks in the non-volatile memory system having a least amount of valid data.

17. The method of claim 16, wherein the valid data comprises the first validity level data or the second validity level data.

18. The method of claim 13, wherein determining the address for the host file system directory comprises determining file addresses and sizes for files in the host file system directory.

* * * * *